United States Patent
Moser et al.

(10) Patent No.: US 11,785,671 B2
(45) Date of Patent: Oct. 10, 2023

(54) METHOD AND DEVICE FOR PRODUCING MOLDED PARTS WITH A SEMI-FINISHED PRODUCT

(71) Applicant: KRAUSSMAFFEI TECHNOLOGIES GMBH, Munich (DE)

(72) Inventors: Stefan Moser, Hallbergmoos (DE); Dietmar Kraus, Weng (DE); Stefan Schierl, Germering (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 1211 days.

(21) Appl. No.: 16/334,844

(22) PCT Filed: Aug. 3, 2017

(86) PCT No.: PCT/EP2017/069612
§ 371 (c)(1),
(2) Date: Mar. 20, 2019

(87) PCT Pub. No.: WO2018/072906
PCT Pub. Date: Apr. 26, 2018

(65) Prior Publication Data
US 2020/0016816 A1 Jan. 16, 2020

(30) Foreign Application Priority Data
Oct. 17, 2016 (DE) .................... 10 2016 119 703.3

(51) Int. Cl.
*H05B 1/02* (2006.01)
*B29C 51/42* (2006.01)
*H05B 3/02* (2006.01)

(52) U.S. Cl.
CPC ............. *H05B 1/023* (2013.01); *B29C 51/42* (2013.01); *H05B 3/02* (2013.01); *H05B 2203/032* (2013.01)

(58) Field of Classification Search
CPC .... H05B 1/023; H05B 3/02; H05B 2203/032; B29C 51/42
(Continued)

(56) References Cited

U.S. PATENT DOCUMENTS

| 1,650,624 A | * | 11/1927 | Glitzke | ................. H05B 1/0205 |
| | | | | 219/425 |
| 1,949,716 A | * | 3/1934 | Harsch | ..................... C21D 9/00 |
| | | | | 34/223 |

(Continued)

FOREIGN PATENT DOCUMENTS

| CA | 2545440 A1 | 11/2007 |
| DE | 10 2014 010173 A1 | 1/2015 |

(Continued)

OTHER PUBLICATIONS

International Search Report for PCT/EP2017/069612 dated Oct. 25, 2017.

(Continued)

*Primary Examiner* — Eric S Stapleton
(74) *Attorney, Agent, or Firm* — Pearne & Gordon LLP

(57) ABSTRACT

The invention relates to a method for producing molded parts, wherein semifinished product is heated in a heating device and is subsequently fed to a shaping machine. The heating device has a closed housing having a door or has a separately closable opening. The heating device optionally has a dividable housing, in the case of which the housing components can be moved away from each other in order to form an opening and can be moved toward each other in order to form a closed housing. One or more radiant heaters, in particular infrared radiant heaters, are provided in the interior of the housing. Semifinished product is introduced into the interior of the housing and radiant heat produced by the radiant heaters is applied thereto, said semifinished product is heated, and said semifinished product is subse- (Continued)

quently removed from the housing. Thermal convection, which is directed substantially upward in the housing, is produced in the interior of the housing. According to the invention, an air flow counteracting the thermal convection, in particular an air flow directed substantially downward in the interior of the housing, is produced in the interior of the housing.

20 Claims, 9 Drawing Sheets

(58) Field of Classification Search
USPC .......................................................... 219/221
See application file for complete search history.

(56) References Cited

U.S. PATENT DOCUMENTS

| | | | | |
|---|---|---|---|---|
| 3,837,794 | A * | 9/1974 | Phillips | C21D 1/767 432/143 |
| 3,841,614 | A * | 10/1974 | Okuno | B21B 45/004 432/171 |
| 4,032,365 | A * | 6/1977 | Bricmont | B21J 1/06 72/364 |
| 4,078,168 | A * | 3/1978 | Kelly | G05D 23/1906 219/485 |
| 4,158,126 | A * | 6/1979 | Seitz | H05B 1/0252 219/214 |
| 4,225,121 | A * | 9/1980 | Meyer | C23C 8/06 266/259 |
| 4,310,300 | A * | 1/1982 | Mackenzie | F27B 9/2461 432/209 |
| 4,449,923 | A * | 5/1984 | Shimosato | F27B 9/023 165/104.34 |
| 4,478,573 | A * | 10/1984 | Kitayama | F27B 9/208 432/144 |
| 4,588,378 | A * | 5/1986 | Yamamoto | C21D 9/56 432/152 |
| 4,717,339 | A * | 1/1988 | Kersting | F27B 9/38 34/194 |
| 4,763,880 | A * | 8/1988 | Smith | C21D 9/0037 266/259 |
| 4,790,749 | A * | 12/1988 | Mauro | F27B 9/08 432/175 |
| 5,232,145 | A * | 8/1993 | Alley | B23K 1/008 219/390 |
| 5,322,651 | A * | 6/1994 | Emmer | B29C 49/68 264/37.17 |
| 5,558,436 | A * | 9/1996 | Richards | G01K 1/14 374/208 |
| 5,660,543 | A * | 8/1997 | Marks | F27B 17/0083 432/128 |
| 6,036,485 | A * | 3/2000 | Benedetti | C21D 9/005 432/122 |
| 6,122,678 | A * | 9/2000 | Eckel | H05B 47/105 340/567 |
| 6,194,688 | B1 * | 2/2001 | Ellis | F27D 3/12 219/400 |
| 6,257,866 | B1 * | 7/2001 | Fritz | B29C 51/10 425/388 |
| 6,267,587 | B1 * | 7/2001 | Bishop | F27B 9/142 432/128 |
| 6,294,763 | B1 * | 9/2001 | Aono | F27B 9/14 219/400 |
| 7,365,287 | B1 * | 4/2008 | Ellis | F27D 3/12 219/400 |
| 7,577,493 | B2 * | 8/2009 | Sugishita | G05B 11/42 438/362 |
| 8,727,611 | B2 * | 5/2014 | Huppi | G01K 1/08 236/51 |
| 9,610,726 | B1 * | 4/2017 | Upton | B29C 51/00 |
| 10,107,693 | B2 * | 10/2018 | Hofer | G01K 1/20 |
| 10,228,189 | B1 * | 3/2019 | Buck | F27B 9/142 |
| 2003/0085219 | A1 * | 5/2003 | Toll | F26B 9/06 219/400 |
| 2003/0231878 | A1 * | 12/2003 | Shigeura | B01L 7/52 392/407 |
| 2004/0016749 | A1 * | 1/2004 | Miyazawa | B29C 49/6454 219/535 |
| 2004/0113326 | A1 * | 6/2004 | Gernhuber | B29C 49/6409 264/492 |
| 2004/0149733 | A1 * | 8/2004 | Abbott | H05B 3/58 219/535 |
| 2005/0209813 | A1 * | 9/2005 | Kautz | G01K 7/427 374/E7.042 |
| 2005/0236395 | A1 * | 10/2005 | Timans | C30B 31/12 219/497 |
| 2006/0074586 | A1 * | 4/2006 | Kautz | G01K 7/42 374/E7.042 |
| 2008/0298431 | A1 * | 12/2008 | Kautz | G01K 7/427 374/E7.042 |
| 2009/0144014 | A1 * | 6/2009 | Aljabari | G01K 7/42 374/142 |
| 2010/0018960 | A1 * | 1/2010 | Gat | F27B 17/0025 219/494 |
| 2012/0128025 | A1 * | 5/2012 | Huppi | G01K 1/16 374/121 |
| 2012/0261847 | A1 * | 10/2012 | Sirovskiy | B29C 51/422 264/16 |
| 2013/0048626 | A1 * | 2/2013 | Seo | D06F 39/008 392/394 |
| 2013/0099008 | A1 * | 4/2013 | Aljabari | F24F 11/63 236/1 C |
| 2013/0181373 | A1 * | 7/2013 | Stock | B29C 45/1418 425/126.1 |
| 2015/0014300 | A1 * | 1/2015 | Ciuperca | B28B 7/42 219/494 |
| 2015/0179533 | A1 * | 6/2015 | Aoyama | H01L 21/76814 219/757 |
| 2015/0181649 | A1 * | 6/2015 | Ji | H05B 3/0047 219/502 |
| 2015/0211937 | A1 * | 7/2015 | Hofer | G01K 7/42 374/208 |
| 2016/0245706 | A1 * | 8/2016 | Zivkovic | G01K 3/08 |
| 2016/0252268 | A1 * | 9/2016 | Aljabari | G05D 23/1917 702/130 |
| 2016/0338412 | A1 * | 11/2016 | Monsees | H05B 3/146 |
| 2016/0374400 | A1 * | 12/2016 | Monsees | A61M 11/048 131/329 |
| 2016/0381732 | A1 * | 12/2016 | Möench | H10K 71/00 118/641 |
| 2017/0188486 | A1 * | 6/2017 | VanGilder | G01F 1/69 |
| 2020/0016816 | A1 * | 1/2020 | Moser | B29C 51/42 |

FOREIGN PATENT DOCUMENTS

| | | | |
|---|---|---|---|
| EP | 0564354 | A1 | 10/1993 |
| JP | 2005507774 | A | 3/2005 |
| JP | 2013228145 | A | 11/2013 |
| WO | 0192171 | A1 | 12/2001 |

OTHER PUBLICATIONS

Written Opinion for PCT/EP2017/069612 dated Oct. 25, 2017.
Office action issued for Japanese application No. 2019-518520 dated Mar. 3, 2021 and the German translation thereof.

* cited by examiner

METHOD AND DEVICE FOR PRODUCING MOLDED PARTS WITH A SEMI-FINISHED PRODUCT

CROSS-REFERENCE TO RELATED APPLICATIONS

This is a National Stage application of PCT international application PCT/EP2017/069612, filed on Aug. 3, 2017, which claims the priority of German Patent Application No. 10 2016 119 703.3, filed Oct. 17, 2016, both of which are incorporated herein by reference in their entireties.

FIELD OF THE INVENTION

The invention relates to a method for producing molded parts, wherein one or several semi-finished products are heated in a heating device and subsequently fed to a shaping machine. The invention further relates to a device for implementing the method. A preferred application of the invention involves the production of plastic molded parts, which each have a semi-finished product that is provided with a plastic material. Within the meaning of the present invention, a semi-finished product can be any component desired that can be brought to a state with a heating device in which it can be shaped in a subsequent step. In particular, a semi-finished product can be a so-called "organic sheet". "Organic sheet" is usually understood as a component that consists of one or several layers (e.g., glass fiber, carbon fiber or natural fiber), which are impregnated with thermoplastic matrix material (e.g., polypropylene or polyamide).

BACKGROUND OF THE INVENTION

Known from DE 10 2014 010 173 A1 is to feed a semi-finished product to a heating device and heat it therein to a temperature at which the semi-finished product is shaped in a subsequent step, and can possibly be overmolded with a plastic material. In this heating device, two radiant heaters are spaced apart one opposite the other. This forms a heating area that is bounded from above and below by the radiant heaters, and open on its sides. A semi-finished product is moved along a straight transport path through the heating area with the help of a clamping frame or on a wire support. The semi-finished product is provided outside of the heating device on the one side of the heating device, and brought into the heating area of the heating device by means of the clamping frame or wire support. The semi-finished product is there stopped and heated to desired temperature by radiation from the radiant heater. The semi-finished product is subsequently transported further by means of the clamping frame or wire support, and brought out of the heating area on the opposite side, and thus out of the heating device. The semi-finished product preheated in this way can then be transported by means of suitable gripping devices to a shaping machine, for example an injection molding machine. The open sides make the heating device unfavorable from an energy standpoint, and the production of molded parts using this heating device is associated with correspondingly higher costs.

Further known from prior art is to use a heating device having a closed housing with a door and radiant heaters inside of the housing, in particular infrared radiant heaters. The semi-finished product is introduced into the housing with the door opened, and the door is subsequently closed. The semi-finished product is exposed to the thermal radiation generated by the radiant heaters and heated. The door of the housing is then opened, and the preheated semi-finished product is removed from the housing. The door can be opened and the semi-finished product can be removed as a function of a selectable heating period, or as a function of a selectable temperature to be reached for the semi-finished product. This type of heating device is more favorable than the one from the aforementioned prior art from an energy standpoint. However, the disadvantage is that the interior of the housing is heated to an undesirably strong extent during the operation of the heating device, and also that an inhomogeneous temperature distribution arises inside of the housing, which has a negative effect on heating up the semi-finished product.

BRIEF SUMMARY OF THE INVENTION

Proceeding from the above, the object of the invention is to indicate a method for producing molded parts in which one or several semi-finished products are energy-efficiently and homogeneously heated in a heating device and then fed to a shaping machine. Another object of the present invention lies in indicating a suitable device for this purpose.

The object mentioned first is achieved by a method with the features in claim 1. The second object is achieved by a device with the features in claim 21. Advantageous embodiments and further developments of the inventions are indicated in the dependent claims.

The fact that an airflow that counteracts the thermal convection is generated inside of the housing, in particular an airflow directed essentially from the top down inside of the housing, prevents the interior of the housing from becoming heated more strongly by rising air in the upper area than in the lower area. This makes it possible to keep the temperature inside of the housing at a constant level. As a consequence, the semi-finished product can be homogeneously heated. In particular, this enables a homogeneous temperature distribution over the entire surface of the semi-finished product.

Atmospheric air can in this case be used for the airflow. However, it is basically also possible to use another gas to generate the airflow desired here. Therefore, the term "air" is here to be understood as any gaseous fluid, even if atmospheric air is preferably to be used.

The semi-finished product can be heated in the furnace in a vertical or a horizontal position.

The semi-finished product can only be shaped, e.g., in a press. However, it can also be shaped and provided with another material, in particular a plastic material, e.g., in an injection molding machine. Therefore, a shaping machine is to be understood as any machine in which the heated semi-finished product can only be shaped or shaped and provided with another material, in particular with a plastic material.

The airflow counteracting the thermal convection can preferably be regulated as a function of the temperature difference $(T_o - T_u)$ between the temperature $T_o$ in the upper area of the housing and the temperature $T_u$ in the lower area of the housing, wherein the airflow is preferably regulated in such a way that the temperature difference is as low as possible. Among other things, the achievable temperature difference also depends on the size of the housing. A temperature difference of nearly 0° C. would be optimal, but in practice can be realized more easily given a relatively small housing. The temperature difference should preferably be less than 15° C., preferably less than 10° C., and very especially preferably less than 5° C. Without the airflow counteracting the thermal convection, a relatively high temperature difference would arise in the housing. Depending on the housing, it can measure 50° C. or more. The temperature $T_o$ in the upper area of the housing and the temperature $T_u$ in the lower area of the housing can here be measured, in particular the temperatures ($T_o$, $T_u$) on the respective interior side of the housing cover and housing floor.

In particular, the airflow can be designed as a flow of circulating air, wherein one or several air channels each with one or several ventilators are used for circulating the air. The air in the area of the housing floor can here be siphoned out of the interior of the housing, in particular through one or several openings in the housing floor, and the siphoned air can be guided over the upper side of the housing via the air channel(s). The air in the upper area of the housing can then be returned to the interior of the housing, in particular through one or several openings in the housing cover.

The ventilator(s) can preferably be speed-regulated and operated via an inverter. Depending on how the temperature difference ($T_o$, $T_u$) changes, the speed can be automatically adjusted by one or several ventilators. The speed is increased when the temperature difference rises, and lowered again when the temperature difference drops back down.

It can also be provided that "compressed air" be introduced into the housing so as to generate an airflow that opposes the thermal convection. To this end, one or several nozzles can be provided in the housing, in particular in the lower area of the housing, which are connected to a suitable compressed air source. Further provided are regulating means, for example a valve array, so as to be able to regulate the pressure and quantity of compressed air flowing into the housing. Depending on how the temperature difference ($T_o$, $T_u$) changes, the quantity or pressure can be automatically adjusted on one or several of the compressed air nozzles. The pressure and/or quantity is increased as the temperature difference rises, and lowered again as the temperature difference drops back down.

As an alternative to the aforementioned circulating air operation and/or compressed air operation or in addition thereto, it can be provided that a supply of fresh air into the interior of the housing be provided when a selectable furnace operating temperature $T_{operating}$ has been exceeded inside of the housing. The furnace operating temperature is preferably measured in the upper area of the housing, in particular on the interior side of the housing cover. Expressed differently, a temperature sensor is provided in the upper area of the housing, in particular on the interior side of the housing cover, for determining a current temperature $T_o$ (t) or a current furnace operating temperature $T_{operating}$ (actual), which is compared with the prescribed furnace operating temperature $T_{operating}$ (desired).

It can further be provided that one or several flaps provided on the housing and/or one or several doors provided on the housing be opened when a selectable furnace operating temperature $T_{operating}$ (desired) inside of the housing has been exceeded, wherein the temperature $T_o$ (actual) measured in the upper area of the housing, in particular on the interior side of the housing cover, or the current furnace operating temperature $T_{operating}$ (actual) is preferably compared with the prescribed furnace operating temperature $T_{operating}$ (desired). The opening of the flaps and/or doors can be provided alternatively or additionally to the supply of fresh air and/or circulating air operation and/or compressed air operation.

As a whole, then, the measures "circulating air operation", "compressed air operation", "supply of fresh air", and "opening of flaps and/or doors" can be combined with each other as desired.

In a preferred embodiment of the invention, several radiant heaters that can be operated independently of each other and several regulating zones $R_n$ can be provided in the housing, wherein each regulating zone $R_n$ has allocated to it precisely one temperature sensor $TS_n$, in particular a pyrometer. Exactly one temperature sensor is always present for a regulating zone.

As an alternative, a thermal camera can be used for temperature measurement. Several measuring points/measuring ranges can be defined on the measured thermal image. The temperature can be measured at each measuring point. When using a thermal camera, each regulating zone has allocated to it a measuring point defined on the thermal image. As a consequence, each regulating zone has allocated to it exactly one measuring point. This one measuring point quasi corresponds to the aforementioned one temperature sensor $TS_n$, which is allocated to the regulating zone $R_n$.

A regulating zone can thus be defined in such a manner that exactly one single active temperature sensor or a single active pyrometer is always present for this regulating zone, so as to measure the thermal radiation emitted by the insert component from the area of the insert component located in front of the lens of this pyrometer. As a consequence, exactly one active temperature sensor or one active pyrometer is allocated to each regulating zone and vice versa. "Active" means as follows: Several pyrometers can be physically present in a regulating zone, but only a single pyrometer is used as the measuring device for temperature regulation, and is thus "active". For example, a second pyrometer can conceivably be provided as a replacement in addition to a first pyrometer that is used and thus "active", so that production can be continued given a failure of the first active pyrometer, wherein the second pyrometer is then switched to "active". However, the second "inactive" pyrometer could also serve as a reference measurement for the first "active" pyrometer.

The number of radiant heaters allocated to a regulating zone is variable. In many instances, a single radiant heater is allocated to a regulating zone. However, it can also be that several radiant heaters are allocated to a regulating zone. As a consequence, one or several radiant heaters can be allocated to each regulating zone $R_n$.

In each regulating zone $R_n$, the current actual temperature value $T_n(t)$ of the temperature of the surface of the semi-finished product that faces the radiant heater(s) allocated to regulating zone $R_n$ can be measured. A desired temperature value $T_n$(desired) can be prescribed for this surface, and the difference between the desired temperature value $T_n$(desired) and the measured current actual temperature value $T_n(t)$ for this surface of the semi-finished product in the regulating zone $R_n$ can be formed, and a current difference value $\Delta_n(t)$ (=current temperature delta in the regulating zone $R_n$) can thus be determined for each regulating zone $R_n$. Proceeding from the above, the regulating zone for which the current difference value $\Delta_n(t)$ is the greatest can be determined, so that a regulating zone $R_n$ with a current maximum difference value $\Delta_n(t)$ (=temperature delta maximum) can be present. The radiant heaters of the other regulating zones can be operated as a function of the respective current maximum differential value $\Delta_n(t)$. A regulated operation can preferably be provided. Reference can also be made to a "master-slave regulation", as known in principle from computer technology. The regulating zone with the maximum difference value $\Delta_n(t)$ constitutes the "master", so to speak, and the remaining regulating zones each form a "slave".

The aforementioned measures make it possible to achieve a uniform heating of all semi-finished products present in the heating device. In addition, the homogeneity of the temperature distribution is improved as viewed for each individual semi-finished product taken separately as well as for any and all semi-finished products.

In particular in the following scenarios, it may be advantageous to synchronously heat up the semi-finished products according to the aforementioned "master-slave regulation":

a) If a semi-finished product is not positioned exactly in the middle between two opposing radiant heaters, one side of the semi-finished product or one surface of the semi-finished product is heated faster, specifically the side or surface less distant from the radiant heater. The energy input into the semi-finished product rises exponentially with decreasing distance, so that even slight deviations from the exactly central positioning have a negative impact. Deviations within a range of several millimeters can already be relevant.

b) If several radiant heaters are arranged one above and/or next to the other in the housing of the heating device and several regulating zones $R_n$ and temperature sensors $TS_n$ are provided for heating a single semi-finished product, each radiant heater can be regulated separately, and all regulating zones $R_n$ simultaneously reach their respective desired temperature. This results in a uniform heating of the semi-finished product.

c) if several heaters are arranged one above and/or next to the other in the housing of the heating device and several regulating zones $R_n$ and temperature sensors $TS_n$ are provided for simultaneously heating several semi-finished products, different desired temperatures can be set for each of the semi-finished products to be simultaneously heated, the regulating zones allocated to each of these semi-finished products can be regulated independently of each other, and each of these semi-finished products can be heated to its own desired temperature. For example, this could be the case when different semi-finished products are to be heated in the heating device. For example, it is conceivable that the semi-finished products to be simultaneously heated consist of the same material, but vary in thickness. Also conceivable is that the semi-finished products to be simultaneously heated have the same thickness, but consist of different materials. Differences in the desired temperature of semi-finished products to be simultaneously heated in the heating device can also be advantageous if the intrinsically identical semi-finished products are to be shaped differently in a subsequent shaping process, so as to obtain differently shaped semi-finished products. Since varying desired temperatures lead to different heating times, a semi-finished product with a low desired temperature would be heated for a longer time, and thus be subjected to a longer soaking time. However, this is not desired, since it can cause a thermal degradation on the semi-finished product, and the desired mechanical properties are no longer achieved. For this reason, it is desirable that all semi-finished products be synchronously heated to their respective desired temperature, despite the varying desired temperatures.

In an embodiment of the invention preferred in terms of regulation technology, time segments, hereinafter referred to as period durations, with a selectable activation time duration, hereinafter referred to as pulse duration, can be prescribed, wherein the resultantly formed time segments each represent a period duration for a pulse width modulation, wherein a period duration is preferably less than 1 second, in particular less than 500 milliseconds, and very particularly preferably less than or equal to 200 milliseconds, so that one or several of all of the radiant heaters allocated to a regulating zone $R_n$ are operated for a selectable pulse duration relative to a period duration, and remain deactivated for the remainder of the period duration, so that, in relation to the period duration, a current pulse duration ED of the one or several or all radiant heater(s) is obtained in the regulating zone $R_n$ in a period duration.

In pulse width modulation, an activation and deactivation duration (pulse duration) is prescribed, in particular calculated, within a PWM period duration for the power splitter (SSR solid state relay) for the heating process in a regulating zone $R_n$. A regulator compares the current actual temperature value $T_n(t)$ of the temperature of the surface of the semi-finished product with a prescribed desired temperature value $T_n$(desired) in each regulating zone $R_n$, and from that generates a corrective signal of 0 . . . 100% for the pulse width modulation of a radiant heater relative to this regulating zone $R_n$.

Within this period duration, the regulator should here repeatedly calculate new pulse duration times during a period duration.

Depending on the application, the number of semi-finished products to be simultaneously heated can be less than the number of present radiant heaters and/or the overall surface of the semi-finished product(s) can be less than the surface that can be exposed to the present radiant heaters, so that there are radiant heaters that are not required. In such a case, the regulating zones allocated to the unrequired radiant heaters should not be considered during operation of the remaining radiant heaters while determining the current maximum difference value $\Delta_n(t)$.

A higher-level regulator can preferably be used, with which all active regulating zones $R_n$ can be monitored. From time to time, in particular in each period duration given a regulated operation, the regulating zone $R_n$(max) can be determined with the current maximum difference value $\Delta_n(t)$ (=temperature-delta maximum), and this regulating zone $R_n$(max) can be used as the master regulating zone for operating the radiant heaters of the other regulating zones. The activation duration ED of the radiant heater(s) of the other regulating zone $R_n$ can here be calculated as follows:

$$ED_n(t) = ED_n(\max) - ED_n\Delta(t), \text{ wherein:}$$

$$ED_n\Delta(t) = ED_n(\max) \times V_{synch} \times [\Delta T(\max) - \Delta T_n(t)]$$

and wherein the components of this formula mean as follows:

$ED_n\Delta(t)$=currently determined difference value on ED for the one or several or all radiant heaters of the regulating zone $R_n$ $V_{synch}$=amplification factor (calculated from the maximum gradient in a suitable regulating system and the dead time of this regulating system for the regulating zone $R_n$)

$\Delta T(\max)$=maximum difference value $\Delta_n(t)$ according to claim 7

$\Delta T_n(t)$=current difference value $\Delta_n(t)$ according to claim 7.

As a result of applying this formula, the output of faster zones is reduced as a function of the temperature delta $\Delta T_n(t)$ of the regulating zone $R_n$ to such an extent that they automatically follow the master zone in the heating characteristic, so that all active regulating zones $R_n$ are heated synchronously to each other, meaning that all active regulating zones $R_n$ reach their desired value at the same time.

Radiant heaters composed of a plurality of radiant heater segments can be used, wherein the radiant heater segments of a radiant heater can be regulated and operated independently of each other. As a consequence, the surface of a semi-finished product to be exposed to a radiant heater can be individually heated, i.e., one radiant heater can be used to heat various areas of a semi-finished product in a different way. For example, a semi-finished product is heated several degrees higher in one partial area, so as to achieve a better binding of the material in this area during the downstream injection molding process. In like manner, for example, a partial area is heated more intensively, so that a stronger/more complex shaping can be achieved in the subsequent shaping process.

In a preferred manner, the semi-finished product can be positioned between opposing radiant heaters, wherein the same distance between the semi-finished product and radiant heater is present on both sides of the semi-finished product. In other words, the semi-finished product would be positioned exactly in the middle between the opposing radiant heaters.

It is further viewed as advantageous if the heating device is preheated before the production process starts or before the production process resumes after an interruption in production, wherein the interior of the housing is heated to a preheating temperature $T1_{pre}$ lying below a selectable furnace operating temperature $T_{operating}$. A temperature adjusted to the fully automatic operation of the heating device and/or to the semi-finished product can here preferably be taken as the basis for the furnace operating temperature $T_{operating}$. Preheating makes it possible to start production immediately after the preheating in the automatic mode. This avoids starting parts and costs, which would be the case without preheating. Should production be interrupted on the shaping machine, the heating device can automatically switch over into a preheating program given a drop below the prescribed preheating temperature $T1_{pre}$. This prevents an excessive cooling of the heating device. As a result, an operator with limited access rights, for example a nightshift operator, can start up production after a prolonged stoppage time of the shaping machine (e.g., 45 minutes) without any problems. Without preheating, production could only be resumed if an experienced fitter for the shaping machine is present, for example the next morning after the nightshift.

If several radiant heaters are operated and several regulating zones are monitored, a check can preferably be performed to see whether the temperature sensor $TS_n$ allocated to a regulating zone $R_n$ is exposed to radiation from a semi-finished product or radiation from a radiant heater of another regulating zone $R_n'$. As a result, it can be determined whether a semi-finished product is present in the housing or not. If semi-finished product is not present in the housing, preheating of the heating device can be accelerated, and the heating device can be brought as close as possible or even set to the desired furnace operating temperature $T_{operating}$. This is because the radiant heaters can in this case be operated at a higher activation duration than if a semi-finished product were present. However, if a semi-finished product is still present in the housing and given one or several regulating zones, the temperature sensor $TS_n$ allocated to the one regulating zone $R_n$ no longer becomes exposed to radiation from a radiant heater of another regulating zone $R_n'$, but rather measures the temperature of the semi-finished product.

In such a case, a temperature limitation is provided for all regulating zones $R_n$ in order to prevent an "overheating" of the semi-finished product. As opposed to the above, the radiant heaters can in this case be operated only with a reduced activation duration. Expressed differently, this means as follows. If several radiant heaters are operated and several regulating zones are monitored, a check can be performed to determine whether the temperature sensor $TS_n$ allocated to a regulating zone $R_n$ is exposed to radiation from a semi-finished product or radiation from a radiant heater of another regulating zone $R_n'$. A higher maximum value for the temperature can be prescribed in the absence of a semi-finished product for the temperature sensor(s) $TS_n$ or pyrometer than in the presence of semi-finished product. For example, a maximum temperature of 450° C. can be prescribed on the temperature sensor(s) or pyrometer(s) in the absence of semi-finished product, while a maximum temperature of 180° C. can be prescribed in the presence of semi-finished product, for example.

Beyond that, it can be advantageous that the heating rate of semi-finished product be monitored and compared with selectable values. As a result, other aspects can also be incorporated into the invention. To this end, a temperature sensor $TS_n$ of a regulating zone $R_n$ is used to monitor the heating rate of semi-finished product allocated to this regulating zone $R_n$, and compare it with a prescribed heating rate, wherein a difference value $\Delta_{heating}$ is formed by subtracting the current heating rate from the prescribed heating rate (heating rate$_{current}$-heating rate$_{desired}$). Depending on the difference value $\Delta_{heating}$, the following cases can now be encountered.

a) In the case where the difference value $\Delta_{heating}$ is negative and quantitatively greater than a first prescribed maximum difference value $\Delta 1_{heating(max)}$, the presence of a defect can be displayed on the temperature sensor $TS_n$. It is here assumed that the temperature sensor $TS_n$, in particular one configured as a pyrometer, is exposed to the vapors that arise while heating the semi-finished product. These vapors can lead to the temperature sensor becoming contaminated, wherein in a pyrometer, it is most often its lens that gets contaminated. Once the prescribed first maximum difference value $\Delta 1_{heating(max)}$ has been reached, it can be assumed that a pyrometer lens has been contaminated, and a corresponding defect can be displayed. A cleaning of the lens might then become necessary and be performed. In particular when commissioning a new heating device with a corresponding new pyrometer, a clean lens is initially present, and a corresponding reference heating rate can be determined and stored in a control device. The latter constitutes the aforementioned prescribed heating rate, with which the current heating rate is compared. If too great a deviation of the current heating rate from the prescribed heating rate or reference heating rate is later determined during production operation, an error message can be output. In other words, this means that the presence of a defect can then be displayed on the temperature sensor $TS_R$, in particular on the pyrometer.

b) In the case where the difference value $\Delta_{heating}$ is negative and quantitatively greater than a second prescribed maximum difference value $\Delta 2_{heating(max)}$, the presence of a defect can be displayed on the radiant heater(s) allocated to the regulating zone R.

c) In the case where the difference value $\Delta_{heating}$ is positive and quantitatively greater than a third prescribed maximum difference value $\Delta 3_{heating(max)}$, the presence of a faulty positioning of the semi-finished product and/or temperature sensor $TS_n$ can be displayed. A heating rate greater than the reference heating rate is thus present. This can have various causes. For example, the distance between the radiant heater and semi-finished product could have been diminished by a faulty positioning. It is likewise conceivable that the semi-finished product not be correctly positioned viewed in its longitudinal direction, as a result of which the pyrometer also "sees" at least the opposing radiant heater or the housing, and detects its radiation. However, it might also be possible that the pyrometer is no longer positioned correctly. As a result, the pyrometer only "sees" partially the semi-finished product and partially the opposing radiant heater or the furnace wall.

When using a thermal camera and pyrometers as the measuring equipment, a measuring point on the thermal image can also be defined at each location where a pyrometer measures the surface of the semi-finished product. As a consequence, the measurement of the pyrometer can be compared with the measurement in the thermal image. It can be concluded from this that the pyrometer has been contaminated.

In a preferred embodiment of the invention, the heating rate can be continuously monitored as follows in order to detect a contamination of the lens. In the heating rate in the range of the melting point, a significant change in the heating rate takes place, with the heating rate most often subsequently increasingly slightly starting at the melting point. Based on the change $d\Delta/dt$, the temperature can be acquired at this point and compared by the depositor with the melting point of the plastic specified in the data sheet. If a deviation is found in the process, it can be concluded that the lens has been contaminated.

The heating rate can preferably be continuously monitored. This means that the change $d\Delta/dt$ over time of the difference value $\Delta_{heating}$ of the heating rate can be monitored, and information can be derived therefrom. Semi-finished products are here successively introduced into the housing, arranged at a selectable position and heated, wherein these semi-finished products are each allocated to one or several regulating zones $R_n$, and wherein a temperature sensor $TS_n$ of a regulating zone $R_n$ is used to monitor the respective heating rate of a semi-finished product. Depending on how the difference value $\Delta_{heating}$ changes over time, this yields various findings. While only a slow change is present given the contamination of a pyrometer lens, the change takes place within the shortest time, and is nearly abrupt, in the case of a defective radiant heater.

An especially preferred embodiment of the method according to the invention can provide that an airflow in the direction of free convection be provided for a selectable period of time, and that the direction of the airflow be reversed and an airflow that counteracts the thermal convection be generated shortly before reaching the melting point of the semi-finished product. Because the airflow is initially co-directional with the free or thermal convection in the heating device, a higher speed is achieved for the air flowing by the semi-finished product. The higher the speed of the warm air flowing by the semi-finished product, the more heat can be transferred to the semi-finished product. Shortly before reaching a selectable temperature, in particular the melting point of the semi-finished product, the direction of the airflow can be reversed, and an airflow that counteracts the thermal convection can be generated, in order to keep the thermal convection in the housing as low as possible, and achieve a homogenization of the temperature distribution in the semi-finished product. As a consequence, a short heating time is achieved when the process of heating the semi-finished product begins, and a homogeneous temperature in the semi-finished product is achieved at the same time by the end of the heating process. When the melting point has been reached can be recognized or determined based on the change in the heating rate. To this end, it is provided that the heating rate be correspondingly evaluated.

In order to achieve the second object mentioned above, a device according to the invention is characterized in that a heating device is provided for the semi-finished product, and a shaping machine is provided for shaping the semi-finished product and possibly applying plastic material to the shaped semi-finished product. The heating device has a closed housing with at least one door. As an alternative or possibly even in addition thereto, the housing has at least one opening, which can be closed with means detached from the housing. For example, a plate can be provided for closing such an opening, which is placed on the opening with a handling device and can be lifted off from there. The handling device that can here preferably be provided is one with which the semi-finished product is introduced into the housing. As an alternative or possibly also in addition thereto, the heating device has a dividable housing, in which the housing components can be moved away from each other to form an opening and toward each other to form a closed housing. One or several radiant heaters are provided inside of the housing, in particular infrared radiant heaters. Further provided are means with which an airflow that counteracts the thermal convection can be generated inside of the housing.

The device according to the invention is also suitable for producing molded parts out of a semi-finished product, and possibly plastic material applied thereto. It is particularly suitable for implementing the method according to one of claims 1 to 18.

Within the meaning of the present invention, a door is to be understood as any kind of mechanically activatable closing element that can be used to generate and again eliminate an opening in the housing. Therefore, an opening can be generated or provided in the housing by activating the door or closing element in the opening direction, through which the semi-finished product can be introduced and there positioned. The opening can be closed again by activating the door or closing element in the closing direction, thereby forming a closed housing. Such a door can be designed as a revolving door or sliding door.

However, it is also possible to provide a dividable housing, wherein the housing components can be moved away from and toward each other. In this way, an opening can likewise be generated and provided, through which the semi-finished product can be introduced into the interior of the housing. In the simplest case, the housing can consist of two components, in particular of two halves, which when joined together form a closed housing. In the parted state, an opening is provided within the meaning of the present invention.

In an especially simple embodiment, the housing has only one large enough and suitably shaped opening, through which the semi-finished product can be introduced into the housing. This opening can be closed with a plate, which can be placed on this opening and again removed from there by means of a handling device. The handling device with which the semi-finished product is introduced into the housing can here preferably be provided.

In a preferred embodiment, one or several air channels each with one or several ventilators can be provided, wherein the speed of one or several of the ventilators can preferably be regulated, in particular by means of suitable inverters. The air channel(s) can be connected to one or several openings in the housing floor on the one hand, and to one or several openings in the housing cover on the other. The ventilator(s) can thus be used to generate an airflow in the housing, wherein air in the area of the housing floor is siphoned out of the interior of the housing, the siphoned air is guided via the air channel(s) on the upper side of the housing, and returned into the interior of the housing in the upper area of the housing. Depending on the setting of the ventilators, however, an airflow in the reversed direction can also be generated. The device configured in this way can be used to generate an air recirculation, wherein the direction of airflow can be freely adjusted. As a result, an airflow can be generated that counteracts the thermal convection, in particular for implementing the method according to claim 1. If needed, however, an airflow in the opposite direction can also be generated, in particular for implementing the method according to claim 20.

In order to increase the flexibility of the heating device, one or several closable and openable air channel flaps can be provided on one or several of the air channels, which can provide for the supply of fresh air or some other gas into the interior of the housing as needed.

In another embodiment, one or more nozzles can be provided in the housing, in particular in the lower area of the housing, which are connected to a suitable compressed air source. In this way, compressed air can be introduced into the interior of the housing, so as to generate an airflow directed opposite to the thermal convection. Regulating means can preferably be provided, for example a valve assembly with a suitable valve control device, so as to be able to regulate the pressure and quantity of air flowing into the housing. Depending on how the temperature difference $(T_o-T_u)$ changes, the quantity or pressure can thus be automatically adjusted at one or several of the compressed air nozzles.

One or several housing flaps and/or one or several doors can likewise be provided on the housing, through which fresh air can flow into the interior of the housing and warm air can flow out of the interior of the housing in the open state. The already existing doors provided for introducing semi-finished product can be provided as doors for introducing fresh air.

One or several housing flaps are preferably provided on the upper side of the housing in the housing cover, which serve primarily to allow warm air to flow out of the interior of the housing. One or several housing flaps are preferably provided on the lower side of the housing in the housing floor and/or in the lower area of the side walls of the housing, which serve primarily to allow air to flow into the interior of the housing. The doors are primarily there so that semi-finished product can be introduced into the housing and removed from the latter with the door open. However, fresh air can also flow into the housing and warm air can flow out of the housing as long as the door is open.

The arrangement of the doors along with the structural design and activation type and direction for the doors or door elements depends on the respective design parameters of the housing 1 and the shape of the semi-finished product to be heated. This also applies analogously to the housing flaps and the air channel(s).

Several radiant heaters that can be operated independently of each other and several regulating zones $R_n$ can be provided in the housing of the heating device. Each regulating zone $R_n$ here has allocated to it precisely one temperature sensor $TS_R$, in particular a pyrometer. The number of radiant heaters allocated to a regulating zone can vary, and depends in particular on the size of the semi-finished product to be exposed to radiant heat. Therefore, each regulating zone $R_n$ can have allocated to it one or several radiant heaters. A variety of configurations are here conceivable, of which several will be outlined in more detail in the description of exemplary embodiments and drawing reference to suitable figures.

Several pairs of radiant heaters can preferably be formed or provided, wherein each of these pairs consists of two spaced apart radiant heaters that face each other. Each pair of radiant heaters is thus designed to expose the semi-finished product located between them to thermal radiation.

A first embodiment of the device according to the invention with pairs of radiant heaters can provide that a partition be built into the housing between adjacent pairs of radiant heaters, so that several chambers are present in the housing, and a pair of radiant heaters is present in each chamber. A pair of radiant heaters is provided for heating exactly one piece of semi-finished product. The partition can also be designed to be more or less thermally insulating. This embodiment is advantageous in particular when several shaping cavities are present in the shaping machine, so that several semi-finished products can be reshaped at the same time in a single operation, and possibly provided with a plastic material, in particular in a case where the shaping machine is designed as an injection molding machine with a multi-cavity injection molding tool. Therefore, this first embodiment can also be referred to as a multi-cavity device.

A second embodiment of the device according to the invention with pairs of radiant heaters can provide that one or several pairs of radiant heaters be provided for acting on a single semi-finished product. The object here is thus for the semi-finished product to have a size that requires operating several pairs of radiant heaters. In normal cases, several regulating zones are then also present, so that this embodiment can also be referred to as a device with several regulating zones. In particular, several regulating zones are here present for a single semi-finished product.

Radiant heaters assembled out of several radiant heater segments can basically also be used. It can here be advantageous that the individual radiant heater segments can be operated and regulated independently of each other.

BRIEF DESCRIPTION OF THE DRAWINGS

The invention will be described in more detail below based on exemplary embodiments and drawing reference to the figures. Shown on.

DESCRIPTION OF EXAMPLE EMBODIMENTS

Figure 1:
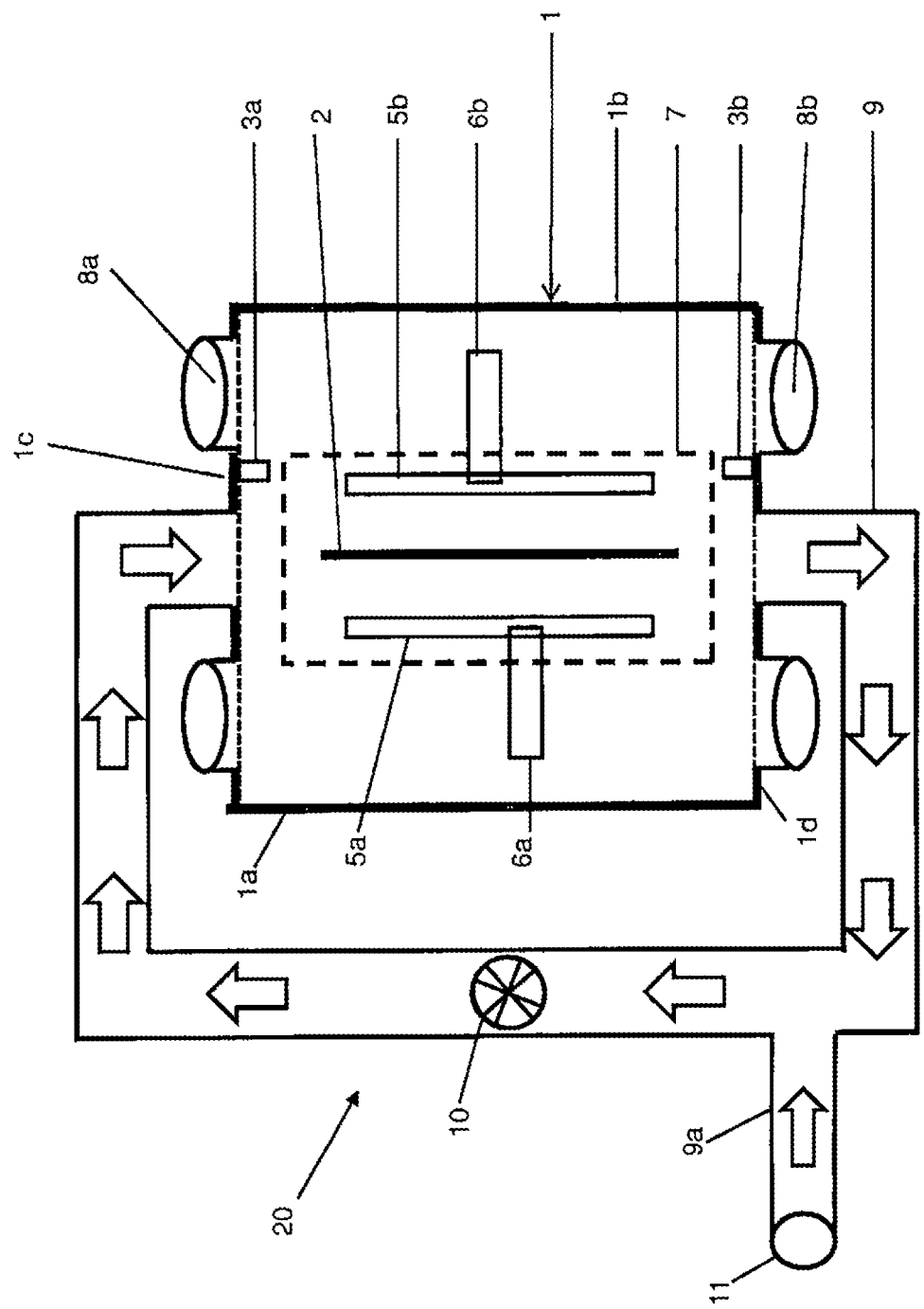
FIG. 1 is a first embodiment of a heating device according to the invention.

FIG. 1 presents a highly schematic view of a heating device 20 configured according to the invention with a housing 1 with side walls 1a and 1b, a housing cover 1c and a housing floor 1d. The presence of a door 7 on the front side of the housing 1 is denoted by a dashed line. With the door 7 open, a semi-finished product 2 to be heated can be introduced into the interior of the housing 1 and taken out again. A vertical arrangement of the semi-finished product 2 is provided in the present exemplary embodiment. Provided inside of the housing 1 is a pair of radiant heaters, wherein this pair consists of two spaced apart radiant heaters 5a and 5b that face each other. Each radiant heater has allocated to it a pyrometer 6a and 6b, with which the respective surface temperature of the semi-finished product can be measured. Each of the pyrometers 6a and 6b has a regulating zone, as has yet to be discussed in greater detail in conjunction with the following figures. Provided in the housing 1 are a first furnace temperature sensor 3a on the housing cover 1c on its interior side, and a second furnace temperature sensor 3b on the housing floor 1d on its interior side. For example, these furnace temperature sensors can be thermocouples. These temperature sensors can be used to measure an upper furnace temperature $T_o$ (thermocouple 3a) and a lower furnace temperature $T_u$ (thermocouple 3b). Further provided on the housing 1 are housing flaps 8a above and 8b below, which can be opened and closed as needed. Also provided is an air channel 9, which is connected to an opening in the housing floor 1d on the one hand and to an opening in the housing cover 1c on the other. A variable-speed ventilator is built into the air channel 9. The ventilator 10 on FIG. 1 is operated in such a way that air is siphoned out of the interior of the housing in the area of the housing floor 1d, the siphoned air is guided via the air channel 9 on the upper side of the housing 1, and the air in the upper area of the housing is returned into the interior of the housing 1. This airflow is denoted by the arrows recorded in the air channel 9. A branch line 9a is connected to the air channel 9, and its end has secured to it an air channel flap 11, through which fresh air can be supplied with the air channel flap 11 open, as intended to be illustrated by the arrow in the branch line 9a.

Figure 2:
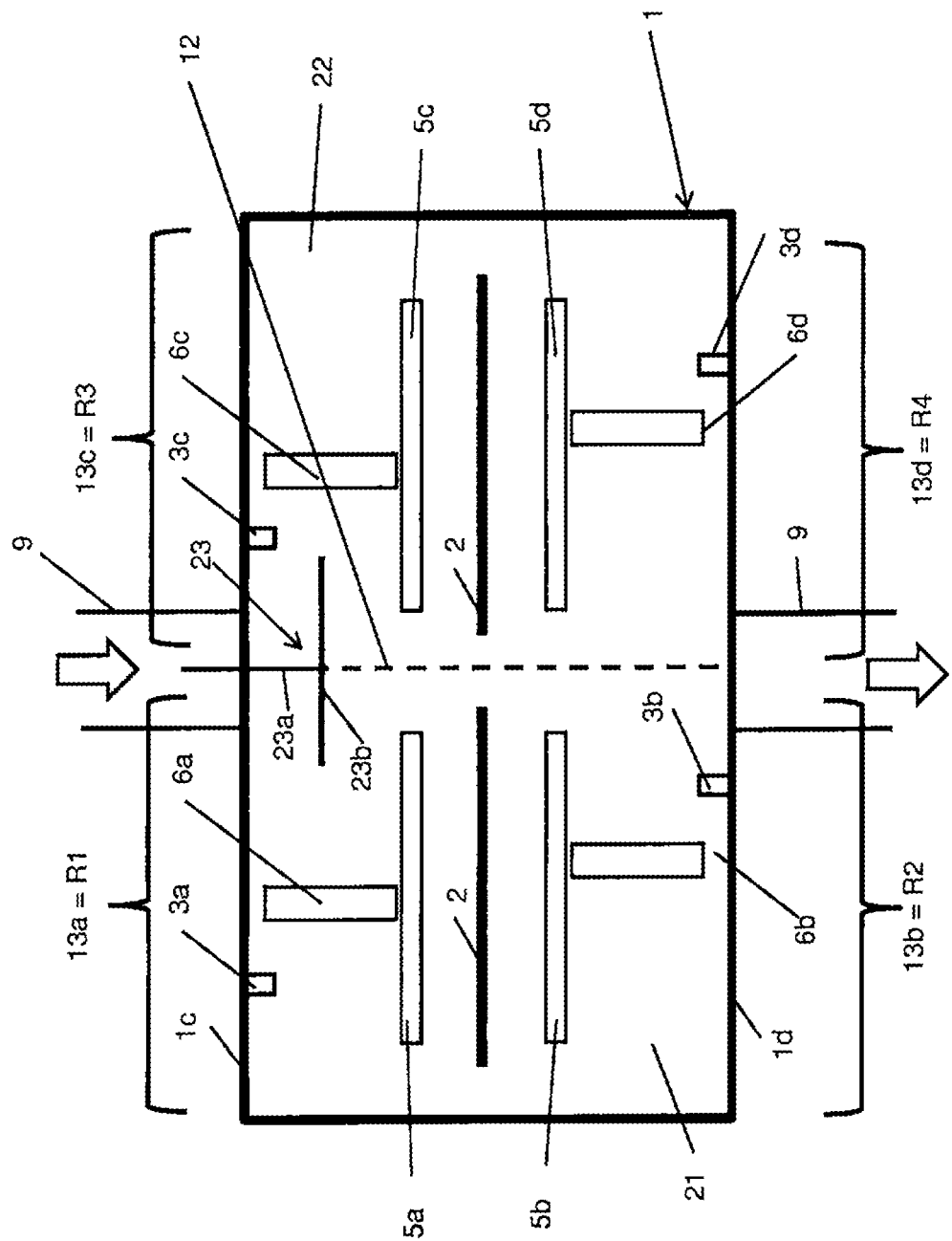
FIG. 2 is a second embodiment of a heating device according to the invention.
Figure 3:
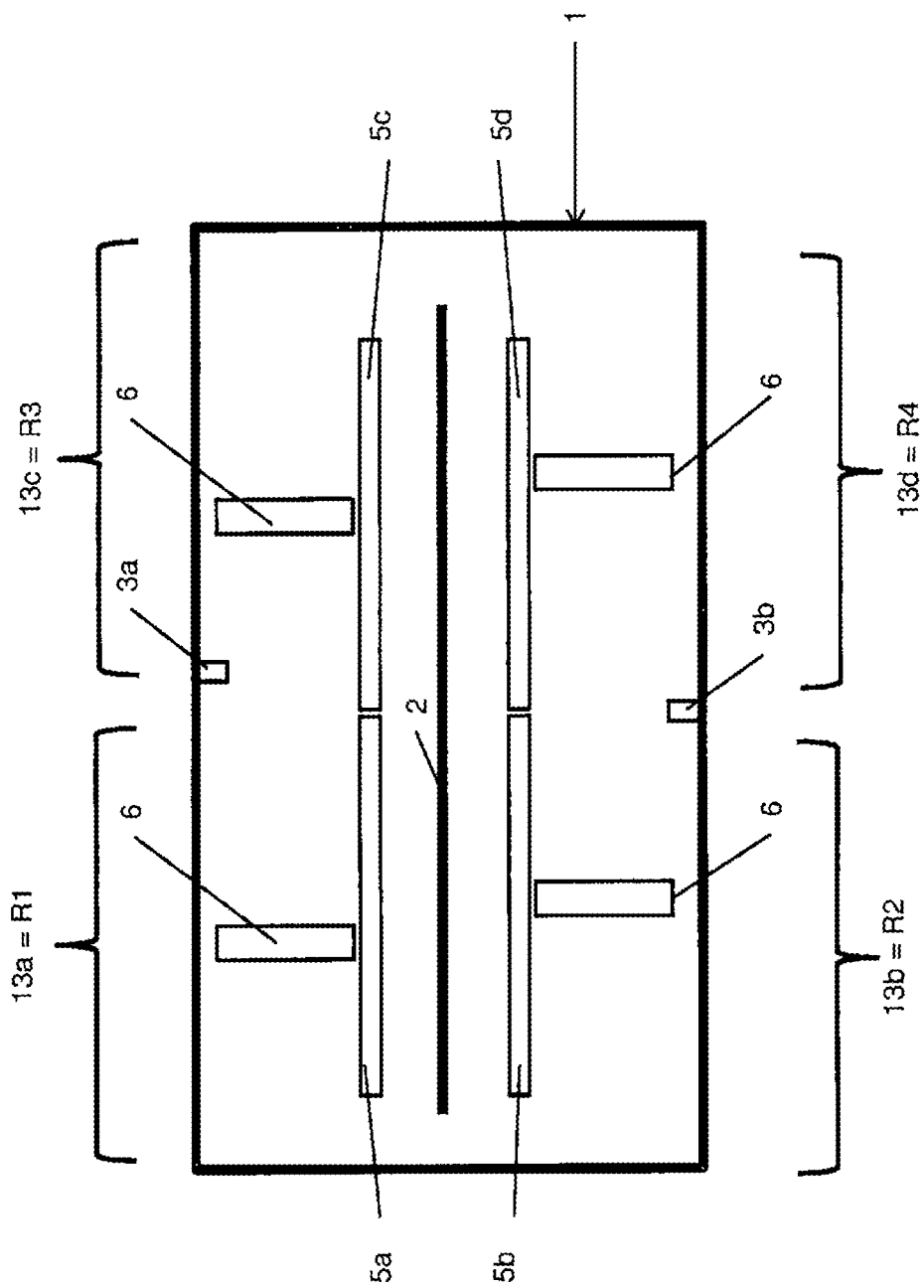
FIG. 3 is a third embodiment of a heating device according to the invention.

The housing 1 is shown without a door 7 and without the housing flaps 8a, 8b on the following FIGS. 2 and 3.

The so-called multi-cavity operation or multi-cavity device is to be described in more detail based on FIG. 2. As opposed to FIG. 1, a horizontal arrangement of the semi-finished product in the heating device is here provided. However, a vertical arrangement could basically also be provided here. Present inside of the housing 1 is a partition 12, which divides the interior of the housing into two chambers 21 and 22. The partition 12 can be designed to be more or less thermally insulating. However, it is basically also possible to omit the partition 12. The thermal separation can make sense if different temperature ranges prevail in the furnace. In addition, a thermal separation can be advantageous for guiding the airflow in a targeted manner. The air channel 8 is only partially shown, specifically the sections connected to the housing cover 1c and to the housing floor 1d. In order to distribute the incoming airflow to both chambers 21 and 22 as uniformly as possible, a suitably designed guide plate 23 is arranged in the upper area of the housing 1. The guide plate 23 essentially has a vertical guide plate piece 23a and a horizontal guide plate piece 23b, which each are configured according to the requirements placed on airflow distribution. A pair of radiant heaters is arranged in each chamber, between which a piece of semi-finished product 2 to be heated is centrally positioned. As a consequence, the chamber 21 is outfitted as follows: Radiant heaters 5a and 5b, pyrometers 6a and 6b, furnace temperature sensors 3a (top) and 3b (bottom), regulating zones 13a and 13b. The chamber 22 is outfitted as follows: Radiant heaters 5c and 5d, pyrometers 6c and 6d, furnace temperature sensors 3c (top) and 3d (bottom), regulating zones 13c and 13d. As already stated above when describing the invention, the following applies. A regulating zone is defined such that always exactly one pyrometer is present for this regulating zone, so as to detect the radiation from the area of the housing located in front of the pyrometer lens. In the present exemplary embodiment, there are thus four regulating zones $R_1$, $R_2$, $R_3$ and $R_4$. This exemplary embodiment further provides that each of these regulating zones has exactly one radiant heater allocated to it. Another way of routing the airflow into the chambers 21 and 22 can also be provided. For example, a separate section of the air channel 9a could be connected to each chamber, so that two air channel sections 9 empty into the housing cover 1c and two air channel sections 9 empty into the housing floor 1d to the left and right of the partition 12. In order to be able to varyingly supply the chambers 21 and 22 with air, separately regulatable ventilators can be provided in the air channel sections that are connected to the housing cover 1c in the area of the chambers 21 and 22. Not shown are doors through which the semi-finished products 2 can be introduced into the chambers 21 and 22. A separate door can preferably be provided on the housing 1 for each of the chambers 21, 22.

FIG. 3 shows a second embodiment of a device according to the invention, wherein only the housing 1 of the heating device is depicted for the sake of simplicity. Provided here are two pairs of radiant heaters for acting on a single piece of semi-finished product 2, specifically a first pair of radiant heaters 5a and 5b in the left area of the housing 1 and a second pair of radiant heaters 5c and 5d in the right area of the housing 1. The semi-finished product 2 has a size that requires the operation of two pairs of radiant heaters. Several regulating zones $R_1$, $R_2$, $R_3$ and $R_4$ are here present for a single piece of semi-finished product 2. This embodiment can thus also be referred to as a device with several active regulating zones. The air channel 9 (see FIG. 1 and FIG. 2) has here been completely omitted for the sake of simplicity. A variety of options are conceivable and can be implemented by the expert as to how the airflow can be fed into the housing 1 and removed therefrom. Also present is a door in the housing 1, which has not been delineated here.

Figure 4B:
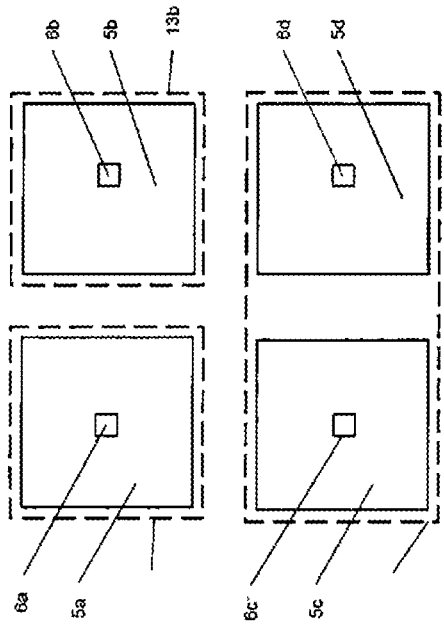
FIG. 4*a*-4*d* are different variants for how radiant heaters are allocated to regulating zones.
Figure 4D:
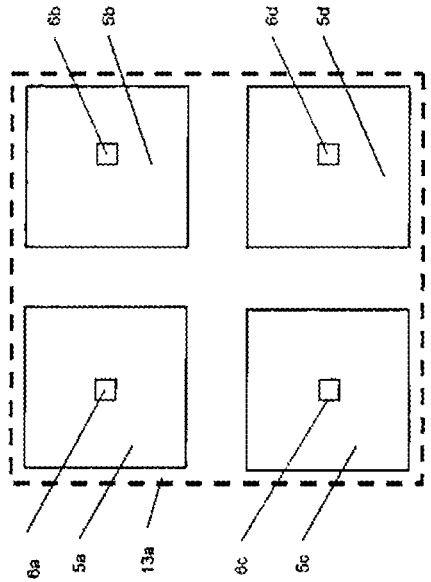
Figure 4A:
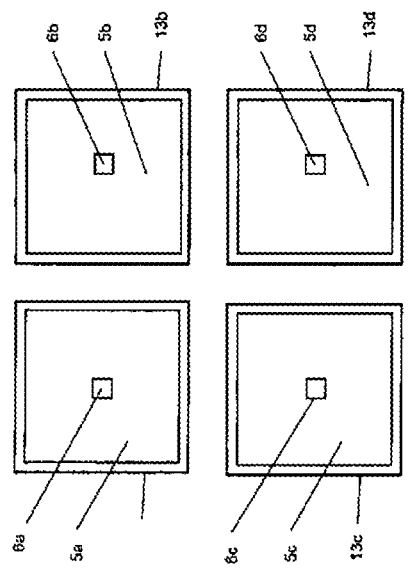
Figure 4C:
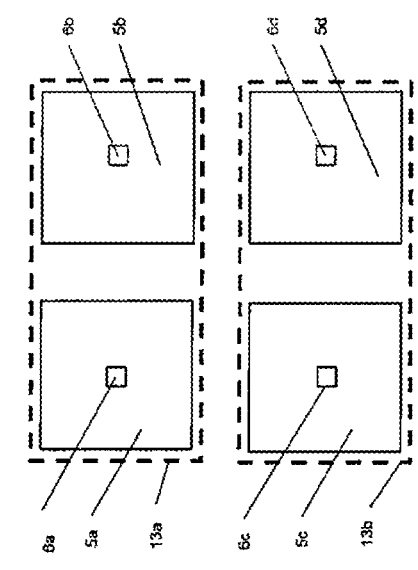

Various options for allocating radiant heaters to regulating zones will be described below based on FIGS. 4a, 4b, 4c and 4d. A top view of a group of four radiant heaters is shown.

a) FIG. 4a shows an embodiment with four regulating zones 13a, 13b, 13c and 13d, each with an active pyrometer 6a, 6b, 6c and 6d. A separate radiant heater 5a, 5b, 5c and 5d is present for each regulating zone.

b) FIG. 4b shows an embodiment with three regulating zones outlined with dashed lines and four radiant heaters, wherein the regulating zone 13c comprises two radiant heaters 5c and 5d, and the regulating zones 13a and 13b each have only a single radiant heater 5a or 5b. An active pyrometer 6c is present in the regulating zone 13c. A second pyrometer 6d is either not present or inactivated. An "inactive" pyrometer could also be used only during a measuring operation. For example, the "inactive" pyrometer could serve to measure reference values relating to the values measured by the "active" pyrometer.

c) FIG. 4c shows an embodiment with two regulating zones outlined with dashed lines and four radiant heaters, wherein the regulating zones 13a and 13b each comprise two radiant heaters. The radiant heaters 5a and 5b are allocated to the regulating zone 13a, while the radiant heaters 5c and 5d are allocated to the regulating zone 13b. An active pyrometer 6a is present in the regulating zone 13a. A second pyrometer 6b is either not present or inactivated. The regulating zone 13b is also equipped with an active pyrometer 6c, and another pyrometer 6d is either not present or inactivated.

d) Only a single regulating zone is present on FIG. 4d, which has allocated to it four radiant heaters 5a, 5b, 5c and 5d. Only a single pyrometer 6a is present or, if additional pyrometers 6b, 6c and 6d are also present, only a single pyrometer 6a is activated.

Figure 5:
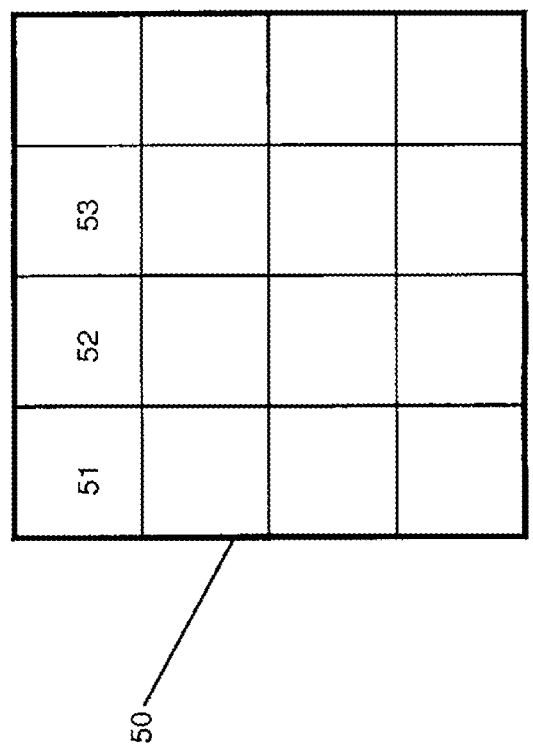
FIG. 5 is a radiant heater with radiant heater segments.

FIG. 5 shows a top view of an embodiment of a radiant heater 50 that is composed of several radiant heater segments 51, 52, 53 and so on. The radiant heater segments can be the same size, in particular in relation to the radiant surface, as shown on FIG. 5. However, radiant heater segments of varying size can basically also be present, provided a continuous, radiant surface can be formed overall.

Figure 6:
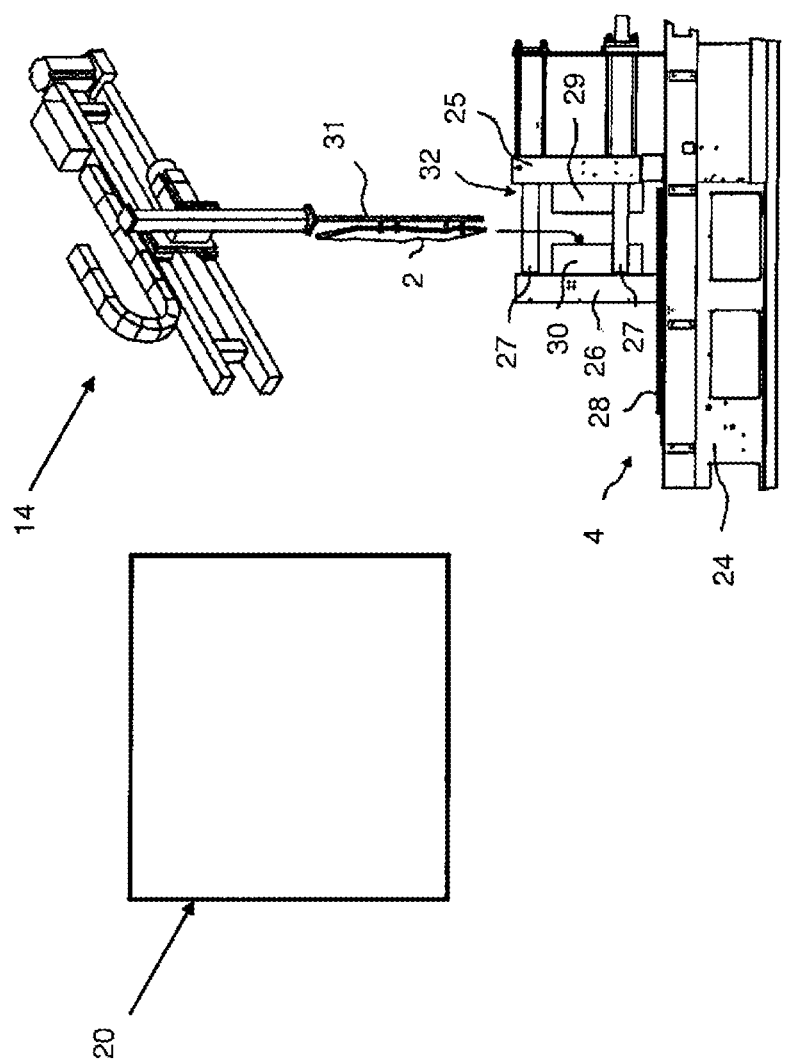
FIG. 6 is a production system for producing overmolded organic sheets.

FIG. 6 schematically depicts how the heating device 20 according to the invention interacts with a shaping machine.

FIG. 1 shows an exemplary injection molding machine 4. Provided between the heating device 20 and injection molding machine 4 is a handling device 14, so as to feed semi-finished product 2 from the heating device 20 to an injection molding tool. The injection molding machine 4 has a machine bed 24. A fixed mold clamping plate 25 is fastened to the machine bed 24, and a movable mold clamping plate 26 is mounted so as to be linearly movable. In order to be mounted in a linearly displaceable manner, the movable mold clamping plate 26 is mounted so that it can be displaced along four horizontal columns. For example, the movable mold clamping plate 26 can be moved along the longitudinal extension of the four horizontal columns 27 by means of hydraulic drives (not shown in any more detail). The movable mold clamping plate 26 is mounted on machine bed 24 so that it can move horizontally using linear guides 28. A first injection mold half 29 is fastened to the fixed mold clamping plate 25. A second injection mold half 30 is fastened to the movable mold clamping plate 26. In the present exemplary embodiment, the two injection mold halves 29 and 30 are designed to be able to reshape a semi-finished product 2 and overmold it with thermoplastic material. For example, the semi-finished product 2 can be a plate-shaped semi-finished product, in particular an organic sheet.

As schematically depicted on FIG. 6, a heating device according to the invention is provided, whose purpose is to heat a semi-finished product placed therein. After the semi-finished product has reached its reshaping temperature, the semi-finished product 2 is removed from the heating device 20 by means of a handling device 14 in a next step. To this end, for example, the handling device 14 can have a needle gripper 31, which is designed to hold the semi-finished product 2. The handling device 14 can also be used to transfer the semi-finished product 2 into a molding tool 32 of the injection molding machine 4 for reshaping and overmolding the semi-finished product. In the exemplary embodiment shown, the molding tool 32 is formed by the two injection mold halves 29 and 30. The injection unit of the injection molding machine 4 is not shown for the sake of simplicity.

The function of the device will be explained in greater detail below, and the inventive method will be described with the use of the device.

The object of the method according to the invention or the regulating/control device is to keep the furnace operating temperature as constant as possible during production and even given machine downtimes. In addition, a homogeneous temperature distribution is also to come about inside of the housing 1 of the heating device 2. The heating device 2 will simply be referred to below as a furnace as well. Before the production process begins or before the production process is resumed after an interruption in production, the furnace is preheated, wherein the interior of the housing 1 is heated to a preheating temperature $T_{pre}$, which lies above a selectable furnace operating temperature $T_{operating}$. The temperature $T_o$ selected as the furnace operating temperature $T_{operating}$ is the one measured at the upper thermocouple 3a. The furnace operating temperature $T_{operating}$ is preferably based upon a temperature $T_o$ adjusted for the fully automatic operation of the heating device and/or one adjusted to the semi-finished product.

In the housing 1, the temperature is measured via temperature sensors, for example thermocouples below (3b) and above (3a). If several chambers are present (see FIG. 2), such a pair of temperature sensors is provided in each of the chambers. If the temperature at the upper thermocouple 3a rises above the prescribed furnace operating temperature, flaps 8a, 8b and, during heating pauses, also the door/doors 7 are opened for a calculated period of time, so as to ensure a regulated cooling to the furnace operating temperature.

The effect of thermal convection (furnace gets warmer above than below owing to airflows/free or thermal convection) is counteracted by the technical measure "counter-airflow" using a regulated counter-airflow. An airflow that counteracts the thermal convection is generated inside of the housing 1 (see arrows on FIG. 1). This airflow is directed essentially from the top down inside of the housing.

The ventilator 10 is used to siphon the cooler air in the lower area of the furnace and return it to the upper area of the furnace via the air channel 9. This creates an airflow against the convection. The ventilator 10 is here speed-regulated and operated by an inverter. If the temperature delta between the temperature sensors below (3b) and above (3a) rises, the speed of the ventilator 10 is automatically adjusted (increased/decreased).

The following procedure is followed in order to heat up semi-finished products as synchronously as possible:

A higher-level regulator observes all "active" regulating zones $R_n$ in the housing 1, and computes a current temperature delta for each regulating zone $R_n$ as follows. In each regulating zone $R_n$, the current actual temperature value $T_n(t)$ is measured for the temperature of the surface of the semi-finished product facing the radiant heaters allocated to the regulating zone $R_n$. A desired temperature value $T_n$(desired) is prescribed for this surface, and the difference between the desired temperature value $T_n$(desired) and the measured current actual temperature value $T_n(t)$ for this surface of the semi-finished product in the regulating zone $R_n$ is formed. As a consequence, a current difference value $\Delta_n(t)$ (=current temperature delta in the regulating zone $R_n$) is determined for each regulating zone $R_n$. Proceeding therefrom, the regulating zone for which the current difference value $\Delta_n(t)$ is the greatest is determined, thereby yielding a regulating zone $R_n$ with the current maximum difference value $\Delta_n(t)$ (=temperature delta maximum). The radiant heaters of the other regulating zones can be operated as a function of the respective current maximum difference value $\Delta_n(t)$. A regulated operation can preferably be provided. Reference can also be made to "master-slave regulation". The regulating zone with the maximum difference value $\Delta_n(t)$ constitutes the "master", so to speak, and the remaining regulating zones each comprise a "slave". For example, the regulating zone $R_1$ on FIG. 2 could constitute the "master", and the remaining regulating zones $R_2$, $R_3$ and $R_4$ the "slaves". Depending on the heating rate, another regulating zone could become the "master" over time. The function of "master" is dynamic, so to speak, and not fixed in duration.

Figure 7:
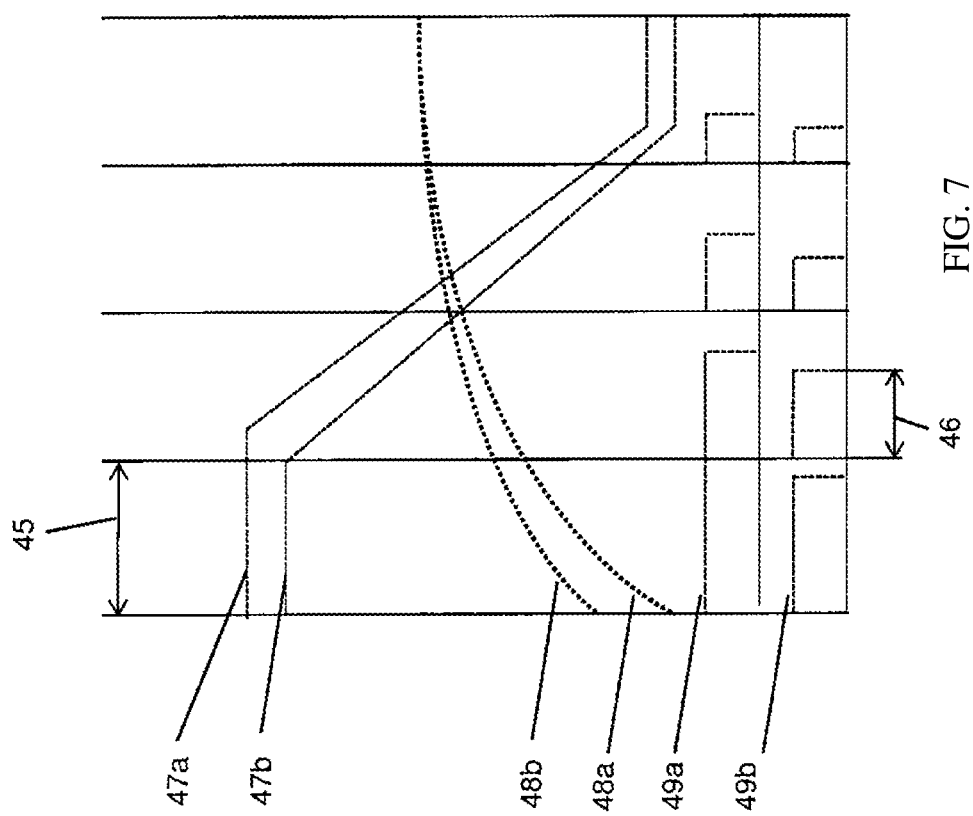
FIG. 7 is the progression of temperature, ED corrective signal and ED pulse duration for two regulating zones to be synchronously heated.

By way of example for two regulating zones "a" and "b", FIG. 7 shows the progression over time for the temperature of the respective semi-finished product along with accompanying electrical variables in relation to the operation of the radiant heater allocated to the respective zone. The reference numbers are supplemented with the letter "a" for regulating zone "a", and with the latter "b" for regulating zone "b". The temperature progression is marked 48a and 48b. The corrective signal calculated by the higher-level regulator (synchronous regulator) is marked 47a and 47b. The activation duration ED of the radiant heaters is marked 49a and 49b. How synchronous heating takes place is evident from FIG. 7. Since the regulating zone "b" heats up faster than the regulating zone "a", shorter pulse durations 49b (i.e., shorter activation duration of the radiant heaters) for the regulating zone "b" are provided from the very outset for regulating zone "b". These pulse durations 49b for regulating zone "b" are kept smaller than the pulse durations 49a for regulating zone "a" as the process continues. As a result, the same temperature on the semi-finished product has been reached for both regulating zones "a" and "b" at the end of the heating process.

Figure 8:
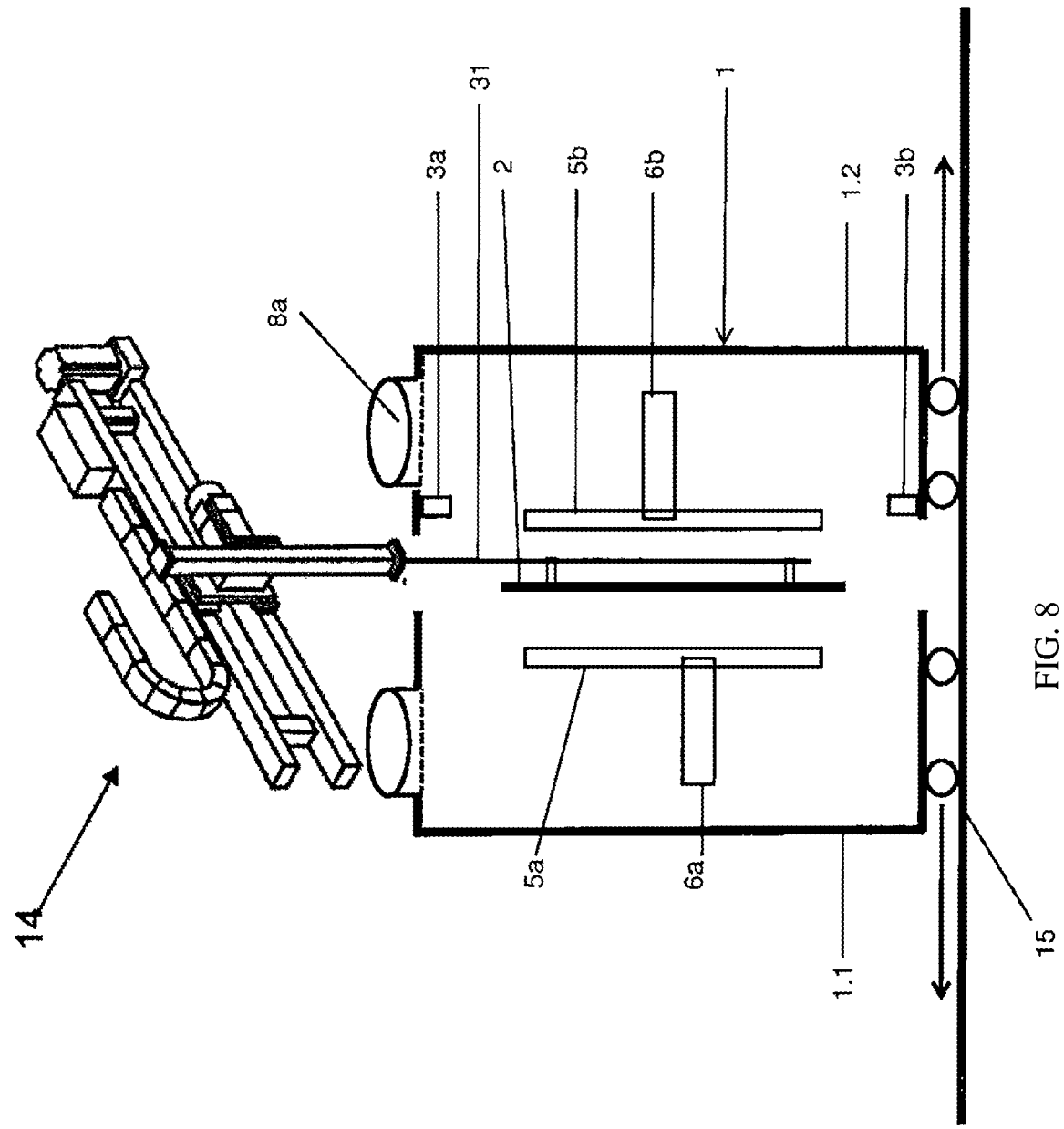
FIG. 8 is a heating device with dividable housing.

According to FIG. 8, the heating device can also have a dividable housing. In the present exemplary embodiment, the housing 1 has two halves 1.1 and 1.2, which can be separated and joined together. The two housing halves are mounted on guides 15, and can be mechanically moved. FIG. 8 presents the situation in a separated state with the semi-finished product 2 introduced. As soon as the needle gripper or clamping gripper 31 has been retracted from the housing 1, the two housing halves 1.1 and 1.2 can be closed, so as to yield a closed housing 1.

Figure 9:
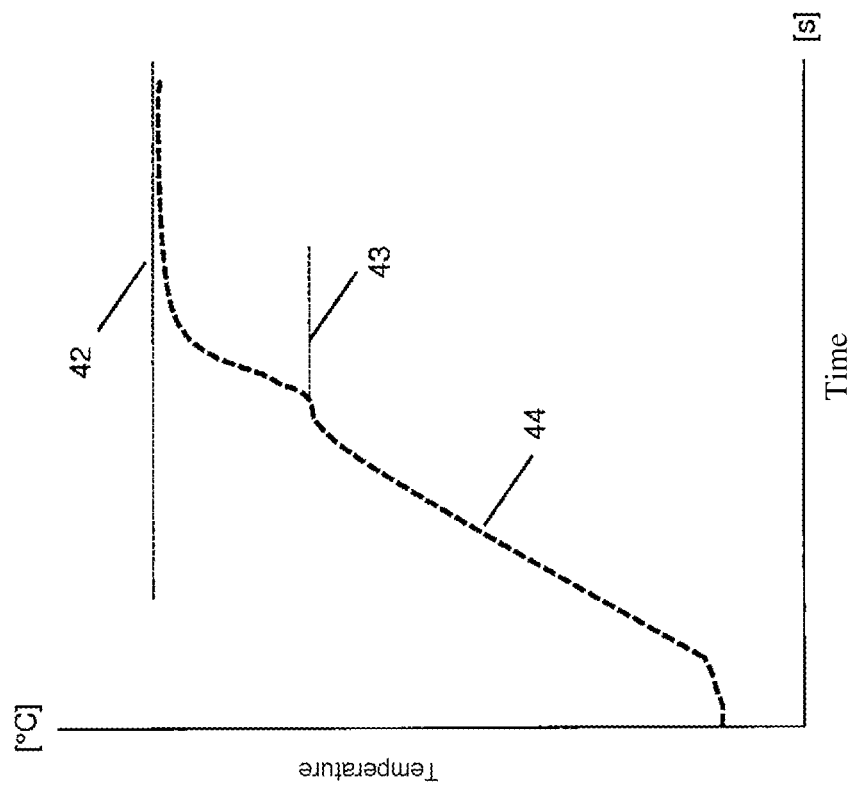
FIG. 9 is the progression of temperature over time for the semi-finished product while heating.

FIG. 9 shows the temperature of a semi-finished product over time. The line 42 is the target temperature to which the semi-finished product is to be heated. The temperature initially rises nearly linearly (line 44). In the melting point range of the plastic material in the semi-finished product (see line 43), the temperature remains nearly unchanged for a short time. The temperature then rises again, and nears the target temperature at the line 42. With respect to the heating rate, i.e., the change in temperature over time $(d\Delta/dt)$, this means as follows. The heating rate $d\Delta/dt$ has a nearly constant value W1 in the area of the line 44. In the melting point range (line 43), a significant change takes place in the heating rate to a second value W2, which is followed starting at the melting point by a slight rise to a third value W3. Let the following be stated with respect to the values: W1 and W3 are distinctly greater than W2. Expressed differently: The progression of the heating rate $d\Delta/dt$ has a distinct bend in the area of W2. Due to the change in the heating rate $d\Delta/dt$, the temperature can be acquired at this point and compared with the melting point of the plastic of the semi-finished product indicated in the data sheet. If a deviation is found in the process, it may be concluded that the lens has been contaminated.

Reference List

| | |
|---|---|
| 1 | Housing |
| 1.1 | Left housing half |
| 1.2 | Right housing half |

-continued

Reference List

| | |
|---|---|
| 1a | Left side wall |
| 1b | Right side wall |
| 1c | Housing cover |
| 1d | Housing floor |
| 2 | Semi-finished product |
| 3a | Upper furnace temperature sensor or upper thermocouple |
| 3b | Lower furnace temperature sensor or lower thermocouple |
| 4 | Injection molding machine |
| 5a-5d | Radiant heater |
| 6, 6a-6d | Pyrometer |
| 7 | Door |
| 8a | Upper housing flaps |
| 8b | Lower housing flaps |
| 9 | Air channel |
| 9a | Branch line |
| 10 | Ventilator |
| 11 | Air channel flap |
| 12 | Partition |
| 13a-13d | Regulating zones |
| 14 | Robot |
| 15 | Mechanical moving unit |
| 20 | Heating device |
| 21 | First chamber |
| 22 | Second chamber |
| 23 | Guide plate |
| 24 | Machine bed |
| 25 | Fixed mold clamping plate |
| 26 | Movable mold clamping plate |
| 27 | Horizontal column |
| 28 | Linear guide |
| 29 | First injection mold half |
| 30 | Second injection mold half |
| 31 | Needle gripper/clamping gripper |
| 32 | Molding tool |
| 42 | Target temperature |
| 43 | Melting point |
| 44 | Area with linear temperature rise |
| 45 | Period duration |
| 46 | Pulse duration |
| 47a | ED corrective signal, regulating zone a |
| 47b | ED corrective signal, regulating zone b |
| 48a | Temperature, regulating zone a |
| 48b | Temperature, regulating zone b |
| 49a | Pulse duration, radiant heater, regulating zone a |
| 49b | Pulse duration, radiant heater, regulating zone b |
| 50 | Radiant heater with segments |
| 51, 52, 53 | Radiant heater segments |

What is claimed is:

1. A method for producing molded parts, wherein one or several semi-finished products are heated in a heating device and subsequently fed to a shaping machine, wherein the heating device has a housing with at least one door, or/and with at least one opening, which can be closed with means detached from the housing, wherein one or more radiant heaters are provided inside of the housing, the method comprising:
introducing the semi-finished product into the interior of the housing,
exposing the semi-finished product to thermal radiation generated by the one or more radiant heaters,
heating the semi-finished product, wherein a thermal convection arises in the interior of the housing, which is directed substantially upward in the housing;
removing the semi-finished product from the housing;
measuring a temperature $T_o$ in an upper area of the housing and a temperature $T_u$ in the lower area of the housing on the respective interior side of the housing cover and housing floor, and regulating an airflow counteracting the thermal convection as a function of a measured temperature difference ($T_o$-$T_u$) between the temperature $T_o$ in the upper area of the housing and the temperature $T_u$ in the lower area of the housing, wherein the airflow is regulated in such a way that the measured temperature difference is less than 15° C., wherein the one or more radiant heaters can be operated independently of each other and several regulating zones are provided in the housing, wherein each regulating zone has allocated to it precisely one temperature sensor, wherein each regulating zone has allocated to it one or more radiant heaters, wherein the measuring step includes measuring a current actual temperature value of the temperature of the surface of the semi-finished product that faces the one or more radiant heaters of the regulating zone, prescribing a desired temperature value for this surface, forming the difference between the desired temperature value and the measured current actual temperature value for this surface of the semi-finished product in the regulating zone, determining a current difference value for each regulating zone, determining the regulating zone for which the current difference value is the greatest, so that a regulating zone with a current maximum difference value is present, and operating the radiant heaters of the other regulating zones as a function of the respective current maximum difference value, wherein a regulated operation is provided.

2. The method according to claim 1, wherein the airflow is designed as a flow of circulating air, wherein one or several air channels each with one or several ventilators are used for circulating the air, wherein air in the area of the housing floor is siphoned out of the interior of the housing, wherein the siphoned air is guided over the upper side of the housing via the air channel(s), and wherein the air in the upper area of the housing is returned to the interior of the housing.

3. The method according to claim 2, wherein the air is siphoned out of the interior of the housing through one or several openings in the housing floor and/or that air is returned to the interior of the housing through one or several openings in the housing cover.

4. The method according to claim 1, wherein compressed air is introduced into the housing so as to generate an airflow in the lower area of the housing, wherein a pressure or quantity of air flowing into the housing is regulated as a function of the temperature difference between the temperature in the upper area of the housing and the temperature in the lower area of the housing.

5. The method according to claim 1, wherein a supply of fresh air into the interior of the housing is provided when a selectable furnace operating temperature has been exceeded inside of the housing, wherein the temperature measured in the upper area of the housing on the interior side of the housing cover is compared with the prescribed furnace operating temperature.

6. The method according to claim 1 further comprising: opening one or several flaps provided on the housing and/or one or several doors provided on the housing when a selectable furnace operating temperature inside of the housing has been exceeded, and comparing the temperature measured in the upper area of the housing on the interior side of the housing cover with the prescribed furnace operating temperature.

7. The method according to claim 1, wherein time segments, hereinafter referred to as period durations, with a selectable activation time duration, hereinafter referred to as pulse duration, are prescribed, wherein the resultantly formed time segments each represent a period duration for a pulse width modulation, wherein a period duration is less than 1 second, so that one or several of all of the radiant heaters allocated to a regulating zone are operated for a selectable pulse duration relative to a period duration, and remain deactivated for the remainder of the period duration, so that, in relation to the period duration, a current pulse duration of the one or several or all radiant heater(s) is obtained in the regulating zone in a period duration.

8. The method according to claim 7, wherein the period duration is less than 500 milliseconds.

9. The method according to claim 1, wherein the number of semi-finished products is less than the number of present radiant heaters and/or the overall surface of the semi-finished product(s) is smaller than the surface that can be exposed to the present radiant heaters, so that there are radiant heaters that are not required, and that the regulating zones allocated to the unrequired radiant heaters are not considered during operation of the remaining radiant heaters while determining the current maximum difference value.

10. The method according to claim 1, wherein a higher-level regulator is used, with which all active regulating zones are monitored, the regulating zone is determined with the current maximum difference value, and this regulating zone is used as the master regulating zone for operating the radiant heaters of the other regulating zones, wherein the activation duration of the radiant heater(s) of the other regulating zone is calculated as follows:

$$ED_n(t)=ED_n(\max)-ED_n\Delta(t), \text{ wherein:}$$

$$ED_n\Delta(t)=ED_n(\max)\times V_{synch}\times[\Delta T(\max)-\Delta T_n(t)]$$

and wherein the components of this formula mean as follows:

$ED_n\Delta(t)$=currently determined difference value on ED for the one or several or all radiant heaters of regulating zone $R_n$ $V_{synch}$=amplification factor (calculated from the maximum gradient in a suitable regulating system and the dead time of this regulating system for the regulating zone $R_n$)

$\Delta T(\max)$=maximum difference value $\Delta_n(t)$ $\Delta T_n(t)$=current difference value $\Delta_n(t)$.

11. The method according to claim 1, wherein the heating device is preheated before the production process starts or before the production process resumes after an interruption in production, wherein the interior of the housing is heated to a preheating temperature lying below a selectable furnace operating temperature, wherein a temperature adjusted to the fully automatic operation of the heating device and/or to the semi-finished product is taken as the basis for the furnace operating temperature.

12. The method according to claim 11, wherein several radiant heaters are operated and several regulating zones are monitored, wherein a check is performed to see whether the temperature sensor allocated to a regulating zone is exposed to radiation from a semi-finished product or radiation from a radiant heater of another regulating zone, wherein it is determined whether a semi-finished product is present in the housing or not, and wherein, if semi-finished product is not present in the housing, a higher maximum value for temperature is prescribed for the temperature sensor(s) or pyrometer(s) than if semi-finished product were present.

13. The method according to claim 1, wherein a temperature sensor of a regulating zone monitors the heating rate of semi-finished product allocated to this regulating zone, and compares it with a prescribed heating rate, wherein a difference value is formed by subtracting the current heating rate from the prescribed heating rate, and wherein, if a difference value is determined:
    a) in the case where the difference value is negative and quantitatively greater than a first prescribed maximum difference value, the presence of a defect is displayed on the temperature sensor,
    b) in the case where the difference value is negative and quantitatively greater than a second prescribed maximum difference value, the presence of a defect is displayed on the radiant heater(s) allocated to the regulating zone,
    c) in the case where the difference value is positive and quantitatively greater than a third prescribed maximum difference value, the presence of a faulty positioning of the semi-finished product and/or temperature sensor is displayed.

14. The method according to claim 1, wherein a thermal camera and one or several pyrometers are used as the measuring equipment, wherein a measuring point on the thermal image is also defined at each location where a pyrometer measures the surface of the semi-finished product.

15. The method according to claim 1, wherein the heating rate is continuously monitored, wherein a significant change, a short reduction, in the heating rate takes place in the range of the melting point of the semi-finished product, after which a slight increase in the heating rate is detected starting at the melting point, wherein the temperature is acquired at this point based on the change, and compared with the melting point of a plastic of the semi-finished product specified in the data sheet, wherein a contamination of the pyrometer is displayed given a deviation between the determined temperature and the temperature from the data sheet.

16. The method according to claim 1, wherein semi-finished products are successively introduced into the housing, arranged at a selectable position and heated, wherein these semi-finished products are each allocated to one or several regulating zones, wherein a temperature sensor of a regulating zone is used to monitor the respective heating rate of a semi-finished product, wherein the change over time of the difference value of the heating rate is monitored.

17. The method according to claim 1, wherein an airflow in the direction of free convection is provided for a selectable period of time, and that the direction of the airflow is reversed and an airflow that counteracts the thermal convection is generated shortly before reaching the melting point of the semi-finished product.

18. The method according to claim 1, wherein the airflow is regulated in such a way that the temperature difference is less than 10° C.

19. A method for producing molded parts, wherein one or several semi-finished products are heated in a heating device and subsequently fed to a shaping machine, wherein the heating device has a housing with at least one door, or/and with at least one opening, which can be closed with means detached from the housing, wherein one or more radiant heaters are provided inside of the housing,
    the method comprising:
    introducing the semi-finished product into the interior of the housing,
    exposing the semi-finished product to thermal radiation generated by the one or more radiant heaters,
    heating the semi-finished product, wherein a thermal convection arises in the interior of the housing, which is directed substantially upward in the housing,
    removing the semi-finished product from the housing,
    directing a thermal convection arising inside of the housing from the top down inside of the housing;
    measuring a temperature in an upper area of the housing and a temperature in the lower area of the housing on the respective interior side of the housing cover and housing floor,
    regulating an airflow counteracting the thermal convection as a function of a measured temperature difference between the temperature in the upper area of the housing and the temperature in the lower area of the housing,
    wherein the airflow is regulated in such a way that the measured temperature difference is less than 15° C., and
    opening one or several flaps provided on the housing and/or one or several doors provided on the housing when a selectable furnace operating temperature inside of the housing has been exceeded, and comparing the temperature measured in the upper area of the housing on the interior side of the housing cover with the prescribed furnace operating temperature.

20. A method for producing molded parts, wherein one or several semi-finished products are heated in a heating device and subsequently fed to a shaping machine, wherein the heating device has a housing with at least one door, or/and with at least one opening, which can be closed with means detached from the housing, wherein one or more radiant heaters are provided inside of the housing,
    the method comprising:
    introducing the semi-finished product into the interior of the housing,
    exposing the semi-finished product to thermal radiation generated by the one or more radiant heaters,
    heating the semi-finished product, wherein a thermal convection arises in the interior of the housing, which is directed substantially upward in the housing,
    removing the semi-finished product from the housing,
    directing a thermal convection arising inside of the housing from the top down inside of the housing;
    measuring a temperature in an upper area of the housing and a temperature in the lower area of the housing on the respective interior side of the housing cover and housing floor, and
    regulating an airflow counteracting the thermal convection as a function of a measured temperature difference between the temperature in the upper area of the housing and the temperature in the lower area of the housing,
    wherein the airflow is regulated in such a way that the measured temperature difference is less than 15° C.,
    wherein a temperature sensor of a regulating zone monitors the heating rate of semi-finished product allocated to this regulating zone, and compares it with a prescribed heating rate, wherein a difference value is formed by subtracting the current heating rate from the prescribed heating rate, and wherein, if a difference value is determined:

a) in the case where the difference value is negative and quantitatively greater than a first prescribed maximum difference value, the presence of a defect is displayed on the temperature sensor,
b) in the case where the difference value is negative and quantitatively greater than a second prescribed maximum difference value, the presence of a defect is displayed on the radiant heater(s) allocated to the regulating zone,
c) in the case where the difference value is positive and quantitatively greater than a third prescribed maximum difference value, the presence of a faulty positioning of the semi-finished product and/or temperature sensor is displayed.

* * * * *